UNITED STATES PATENT OFFICE.

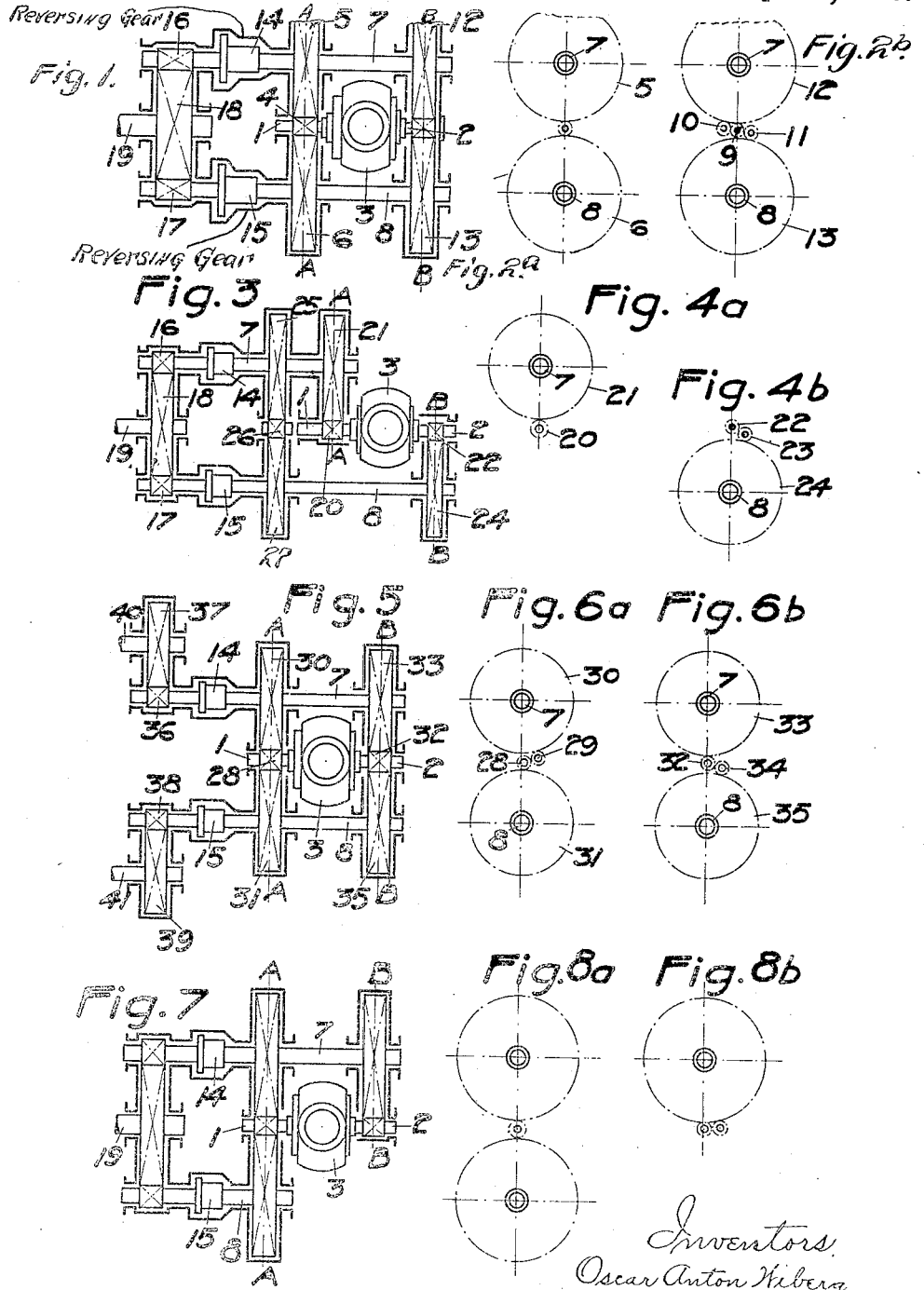

OSCAR ANTON WIBERG AND GEORG KARLSSON, OF FINSPONG, SWEDEN, ASSIGNORS TO SVENSKA TURBINFABRIKS AKTIEBOLAGET LJUNGSTRÖM, OF FINSPONG, SWEDEN.

GEARING FOR STEAM OR GAS TURBINES.

1,337,376.  Specification of Letters Patent.  Patented Apr. 20, 1920.

Application filed June 10, 1919. Serial No. 303,218.

*To all whom it may concern:*

Be it known that we, OSCAR ANTON WIBERG and GEORG KARLSSON, subjects of the King of Sweden, residents of Finspong, Sweden, have invented new and useful Improvements in Gearing for Steam or Gas Turbines, of which the following is a specification.

This invention relates to a gearing for the transmission of power from a steam or gas turbine of the double rotation type having two shafts rotating in opposite directions to one or two driven shafts, for instance one or two propeller shafts.

The invention consists, chiefly, in connecting the two turbine shafts through toothed gears to two intermediate shafts, driving a common driven shaft or two separate shafts through the intermedium of two reversing gears. By this arrangement a reliable turbine plant is obtained; moreover, reversing gears having small dimensions may be used.

Several embodiments of the invention are diagrammatically shown in the accompanying drawing. Figures 1, 3, 5 and 7 are longitudinal sections through four embodiments of the invention, respectively. Figs. 2$^a$ and 2$^b$ are diagrammatic cross sections on the lines A—A and B—B, respectively, of Fig. 1. Figs. 4$^a$ and 4$^b$, 6$^a$ and 6$^b$, 8$^a$ and 8$^b$ show cross sections on the lines A—A and B—B in Figs. 3, 5 and 7, respectively.

In the embodiment shown in Figs. 1, 2$^a$ and 2$^b$, the numerals 1 and 2 designate the oppositely rotating shafts of a steam or gas turbine 3 of the double rotating type. The shaft 1 is connected by means of a pinion 4 secured thereto to two toothed wheels 5, 6 on the shafts 7 and 8, respectively. The shaft 2 which, as stated, rotates in the opposite direction to that, in which the shaft 1 rotates, is connected by means of a pinion 9, secured thereto, to two pinions 10 and 11. The pinion 10 meshes with a toothed wheel 12 on the shaft 7, while the pinion 11 meshes with a toothed wheel 13 on the shaft 8. The two turbine shafts, while rotating in opposite directions, will thus coöperate for driving the shafts 7 and 8, the turbine shafts and the shafts 7 and 8 being through the gearing described operatively connected so as to cause the turbine shafts to rotate with the same speed, independently of the power transmitted through the one shaft or the other of the shafts 7 and 8.

The shafts 7 and 8 are connected through reversing gears 14 and 15, respectively, to the shafts of pinions 16 and 17, respectively, meshing with a common toothed wheel 18 on the driven shaft 19, which may be for instance a propeller shaft. The reversing gears 14 and 15 may be of any suitable, well known type and may be controlled by any suitable means, not shown in the drawing.

In the constructional form shown in Figs. 3, 4$^a$ and 4$^b$ the turbine shaft 1, is connected through the toothed gears 20, 21 to an intermediate shaft 7, the other turbine shaft 2 being connected through the toothed gears 22, 23, 24 to the intermediate shaft 8. The two intermediate shafts are further interconnected by means of the toothed gears 25, 26, 27 so as to effect an operative connection between the turbine shafts and the intermediate shafts. The shafts 7 and 8 are connected through reversing gears 14 and 15, respectively, and the toothed gears 16, 17, 18 to the driven shaft 19, as in the embodiment shown in Fig. 1.

The toothed gearing shown in Figs. 5, 6$^a$ and 6$^b$ is adapted for the transmission of power to two driven shafts. The turbine shaft 1 is connected through the toothed gears 28, 29, 30 to the intermediate shaft 7 and through the toothed gears 28, 31 to the intermediate shaft 8. The turbine shaft 2 is connected in a similar way through the toothed gears 32, 33 to the intermediate shaft 7 and through the toothed gears 32, 34, 35 to the intermediate shaft 8. Also in this embodiment an operative connection is effected between the turbine shafts and the intermediate shafts. The intermediate shafts 7 and 8 are connected through reversing gears 14 and 15, respectively, and toothed gears 36, 37 and 38, 39, respectively, to the driven shafts 40 and 41, respectively.

Figs. 7, 8$^a$ and 8$^b$ show an embodiment, in which the turbine shaft 1 is connected both to the intermediate shaft 7 and to the intermediate shaft 8, while the turbine shaft 2 is only connected to the intermediate shaft 7. The intermediate shafts 7, 8 carrying the reversing gears 14 and 15, respectively, are in this embodiment connected to a common driven shaft 19, as in the embodiments shown in Figs. 1 and 3.

Having now particularly described and ascertained the nature of our said invention and in what manner the same is to be performed, we declare that what we claim is:—

1. The combination with a steam or gas turbine having oppositely rotating shafts, of a pair of intermediate shafts, gears connecting the turbine shafts with the intermediate shafts, a reversing gear mounted on each intermediate shaft, and means for transmitting motion from the reversing gears.

2. The combination with a steam or gas turbine having oppositely rotating shafts, of a pair of intermediate shafts, toothed gears for connecting the turbine shafts with the intermediate shafts to form a closed mechanical interconnection of shafts causing the turbine shafts to rotate with the same speed independently of the power transmitted through one shaft or the other of the transmission shafts, a reversing gear connected with each intermediate shaft, and means for further transmitting power from the reversing gears.

3. The combination with a steam or gas turbine having oppositely rotating shafts, of a pair of intermediate shafts, gears connecting each of the intermediate shafts with each of the turbine shafts, a reversing gear connected with each intermediate shaft, and a shaft driven by the reversing gears.

4. The combination with a steam or gas turbine having oppositely rotating shafts, of a pair of intermediate shafts, gears connecting each of the intermediate shafts with each of the turbine shafts, a reversing gear connected with each intermediate shaft, and means for transmitting motion from each of the reversing gears to a separate driven shaft.

5. The combination with a steam or gas turbine having oppositely rotating shafts, of a pair of intermediate shafts, a toothed gear connecting one of the turbine shafts to one of the intermediate shafts, toothed gears connecting the remaining shafts with one another, a separate toothed gear connecting the intermediate shafts with one another, a reversing gear on each intermediate shaft, and means for further transmitting power from said reversing gears.

In testimony whereof we have signed our names.

OSCAR ANTON WIBERG.
GEORG KARLSSON.